US012612260B2

(12) United States Patent
Hsieh

(10) Patent No.: US 12,612,260 B2
(45) Date of Patent: Apr. 28, 2026

(54) OBJECT CONVEYING SYSTEM

(71) Applicants: Taiwan Daifuku Co., Ltd., Tainan
(TW); DAIFUKU CO., LTD., Osaka
(JP)

(72) Inventor: Tsungyu Hsieh, Tainan (TW)

(73) Assignees: Taiwan Daifuku Co., Ltd., Tainan
(TW); DAIFUKU CO., LTD., Osaka
(JP)

( * ) Notice: Subject to any disclaimer, the term of this
patent is extended or adjusted under 35
U.S.C. 154(b) by 162 days.

(21) Appl. No.: 18/780,424

(22) Filed: Jul. 22, 2024

(65) Prior Publication Data

US 2025/0236469 A1     Jul. 24, 2025

(30) Foreign Application Priority Data

Jan. 18, 2024     (TW) ................................. 113102104

(51) Int. Cl.
    *B65G 35/06*         (2006.01)
    *B65G 49/06*         (2006.01)
(52) U.S. Cl.
    CPC ........... *B65G 35/06* (2013.01); *B65G 49/061*
    (2013.01); *B65G 2201/0297* (2013.01)
(58) Field of Classification Search
    CPC ...... B65G 15/30; B65G 35/06; B65G 49/061;
                    B65G 2201/0297; H10P 72/3302
    USPC ..................................................... 198/465.1
    See application file for complete search history.

(56) References Cited

U.S. PATENT DOCUMENTS

| | | | | |
|---|---|---|---|---|
| 5,027,502 A | * | 7/1991 | Sakamoto | .............. B62D 65/12 29/784 |
| 6,726,429 B2 | * | 4/2004 | Sackett | ............... H10P 72/3404 414/331.14 |
| 7,552,683 B2 | * | 6/2009 | Hayashi | .................. B66F 7/065 414/541 |
| 7,806,643 B2 | * | 10/2010 | Friedman | ............ H10P 72/0612 414/217 |

(Continued)

FOREIGN PATENT DOCUMENTS

WO     WO-2019181241 A1 *  9/2019   ....... H01L 21/67733

OTHER PUBLICATIONS

US 2025/0285898 A1, Shen et al., Sep. 11, 2025.*
US 2025/0289667 A1, Su et al.,Sep. 18, 2025.*

*Primary Examiner* — Douglas A Hess
(74) *Attorney, Agent, or Firm* — JCIPRNET

(57)     ABSTRACT

The disclosure discloses an object conveying system includ-
ing an object conveying apparatus and a mounting table. The
object conveying apparatus includes a traveling member, the
vehicle member, and a transporting member. A rail extend-
ing along a horizontal direction is disposed between the
object conveying system and the mounting table. A hori-
zontal moving mechanism of the vehicle member moves
back and forth along the rail. The rail includes a tilt portion
and a horizontal portion. The tilt portion extends obliquely
in a direction away from the object conveying apparatus and
upward in the up-down direction. While the horizontal
moving mechanism is moving away from the object con-
veying apparatus, a first wheel and a second wheel move
along the rail. When the horizontal moving mechanism
moves to the mounting table, and a boundary of the tilt
portion and the horizontal portion is disposed between the
first wheel and the second wheel.

6 Claims, 6 Drawing Sheets

(56) References Cited

U.S. PATENT DOCUMENTS

| | | | |
|---|---|---|---|
| 8,123,456 B2 * | 2/2012 | Wakabayashi | ...... H10P 72/3402 |
| | | | 414/940 |
| 9,004,840 B2 * | 4/2015 | Kinugawa | .............. B65G 1/065 |
| | | | 414/281 |
| 9,899,245 B2 * | 2/2018 | Kikuchi | .............. H10P 72/1918 |

* cited by examiner

OBJECT CONVEYING SYSTEM

CROSS-REFERENCE TO RELATED APPLICATION

This application claims the priority benefit of Taiwanese application serial no. 113102104, filed on Jan. 18, 2024. The entirety of each of the above-mentioned patent applications is hereby incorporated by reference herein and made a part of this specification.

BACKGROUND

Technical Field

The disclosure relates to an object conveying system, and in particular to an object conveying system that improves the tilt issue when a horizontal mechanism moves.

Description of Related Art

In existing object conveying systems, an object conveying apparatus moves between different stopping points to convey objects. When the object conveying apparatus stops at the stopping point, a vehicle member of the object conveying apparatus is moved to the mounting table located in the horizontal direction to perform operations of picking up and setting down objects. However, when the vehicle member approaches the mounting table, the wheels of the horizontal moving mechanism on the vehicle member (the wheels closer to the mounting table in the horizontal direction) generates impacts and vibrations when entering along the bridging portion of the rail. In order to suppress the vibration, the rail is dropped to a lower position than it originally was, causing the vehicle member to become tilted after completely entering the mounting table.

SUMMARY

The disclosure provides an object conveying system that can correct a tilt angle of a vehicle member and reduce the impact when entering a rail.

The object conveying system of the disclosure includes an object conveying apparatus and a mounting table configured adjacent to the object conveying apparatus. The object conveying apparatus includes a traveling member, a vehicle member, and a transporting member. The traveling member is configured on the traveling rail to move along the traveling direction. The vehicle member is disposed below the traveling member and includes a horizontal moving mechanism that moves in the horizontal direction and a lifting mechanism that moves in an up-down direction. The transporting member is disposed below the lifting mechanism. A rail extending in the horizontal direction is configured between the object conveying apparatus and the mounting table. The horizontal moving mechanism moves back and forth along the rail between the object conveying apparatus and the mounting table in the horizontal direction. The horizontal moving mechanism is provided with a first wheel on one side in the horizontal direction and a second wheel on another side. The rail includes a tilt portion and a horizontal portion. The tilt portion extends obliquely in a direction away from the object conveying apparatus in the horizontal direction and upward in the up-down direction. When the horizontal moving mechanism moves in the direction away from the object conveying apparatus in the horizontal direction, the first wheel and the second wheel move along the rail. When the horizontal moving mechanism moves to the mounting table, from the perspective of viewing in the traveling direction, a boundary of the tilt portion and the horizontal portion is located between the first wheel and the second wheel.

In an embodiment of the disclosure, a size of the first wheel is the same as a size of the second wheel. The first wheel and the second wheel are staggered in the traveling direction. The rail includes a first rail and a second rail disposed adjacently in the traveling direction. When the horizontal moving mechanism moves in the direction away from the object conveying apparatus in the horizontal direction, the first wheel is further away from the object conveying apparatus than the second wheel. The first wheel moves along the first rail, and the second wheel moves along the second rail.

In an embodiment of the disclosure, the tilt portion is disposed on the first rail. The horizontal portion is further away from the object conveying apparatus than the tilt portion. The tilt portion extends obliquely toward the horizontal portion.

In an embodiment of the disclosure, the size of the first wheel is smaller than the size of the second wheel. The horizontal portion includes a first horizontal portion and a second horizontal portion closer to the object conveying apparatus than the first horizontal portion. The horizontal height of the first horizontal portion in the up-down direction is greater than the horizontal height of the second horizontal portion in the up-down direction. The tilt portion is disposed between the first horizontal portion and the second horizontal portion to connect the two. When the horizontal moving mechanism moves in the direction away from the object conveying apparatus in the horizontal direction, the first wheel is further away from the object conveying apparatus than the second wheel. When the horizontal moving mechanism moves to the mounting table, the first wheel is located at the first horizontal portion, the second wheel is located at the second horizontal portion.

In an embodiment of the disclosure, the mounting table includes a first mounting table and a second mounting table. The first mounting table is disposed on one side of the object conveying apparatus, and the second mounting table is disposed on another side of the object conveying apparatus. The rail includes a first rail and a second rail. The first rail is configured between the object conveying apparatus and the first mounting table. The second rail is disposed between the object conveying apparatus and the second mounting table. From the perspective of viewing in the horizontal direction, the first rail and the second rail are adjacently disposed. The first wheel is configured adjacent to a third wheel in the traveling direction, and the second wheel is configured adjacent to a fourth wheel in the traveling direction. When the horizontal moving mechanism moves to a side where the first mounting table is located in the horizontal direction, the first wheel and the second wheel move along the first rail. When the horizontal moving mechanism moves to another side where the second mounting table is located in the horizontal direction, the third wheel and the fourth wheel move along the second rail.

In an embodiment of the disclosure, the size of the third wheel is the same as the size of the second wheel, and the size of the fourth wheel is the same as the size of the first wheel.

Based on the above, in the object conveying apparatus of the object conveying system of the disclosure, the horizontal moving mechanism of the vehicle member moves along the rail having the tilt portion and the horizontal portion. The tilt portion extends obliquely in a direction away from the object conveying apparatus and upward in the up-down direction. When the first wheel and the second wheel in the horizontal moving mechanism move along the rail, at least one of the first wheel or the second wheel passes through the tilt portion on the rail, so that the tilt of the vehicle member is corrected. Moreover, after the horizontal moving mechanism moves to the mounting table, the boundary between the tilt portion and the horizontal portion is located between the first wheel and the second wheel. That is, at least one of the first wheel or the second wheel is located on the horizontal portion. Accordingly, the object conveying system of the disclosure can correct the tilt angle of the vehicle member and reduce the impact when entering the rail.

DESCRIPTION OF THE EMBODIMENTS

Figure 1A:
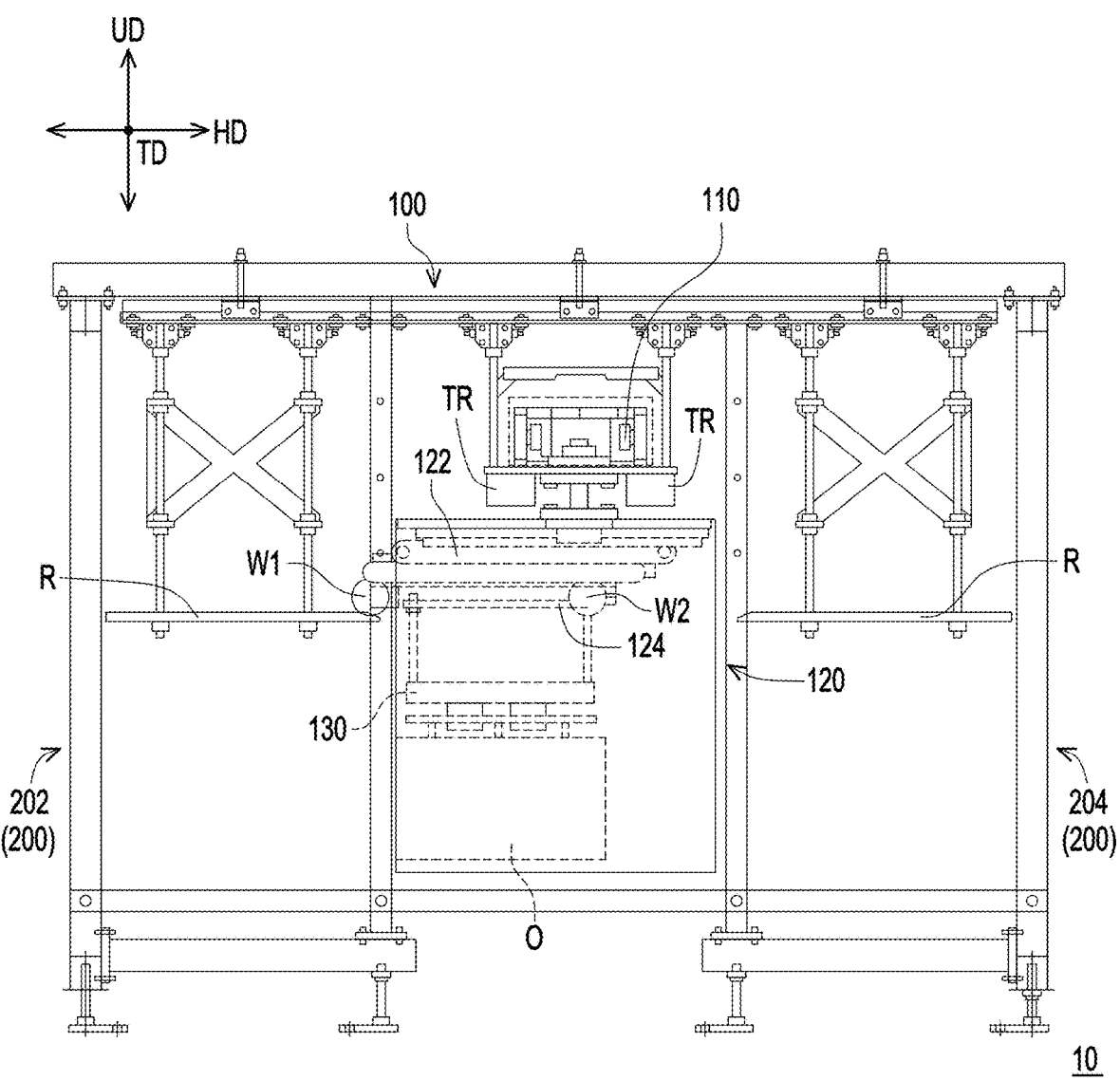
FIGS. 1A and 1B are schematic views of an object conveying system of the disclosure in different operating states.
Figure 1B:
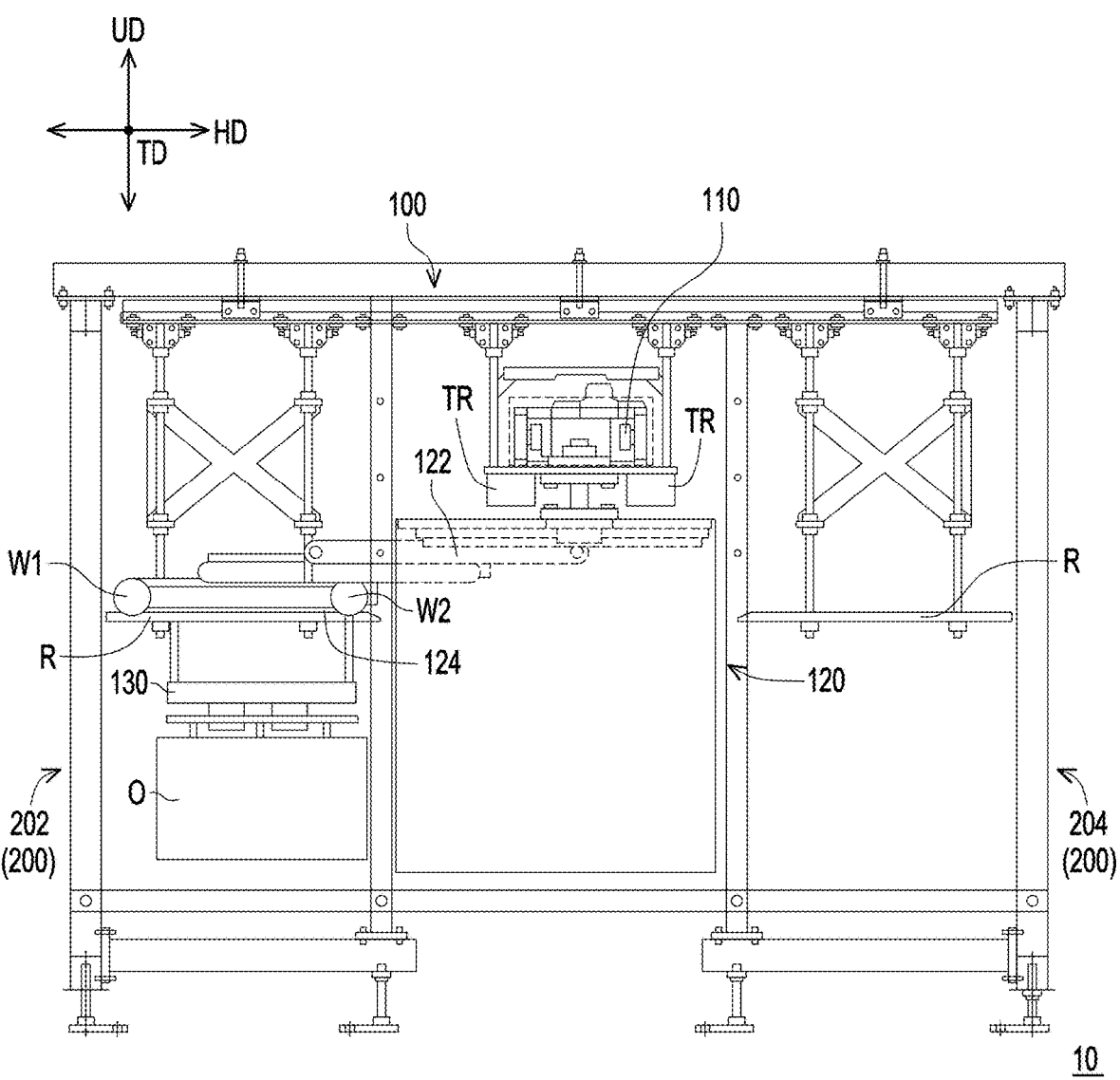
Figure 2:
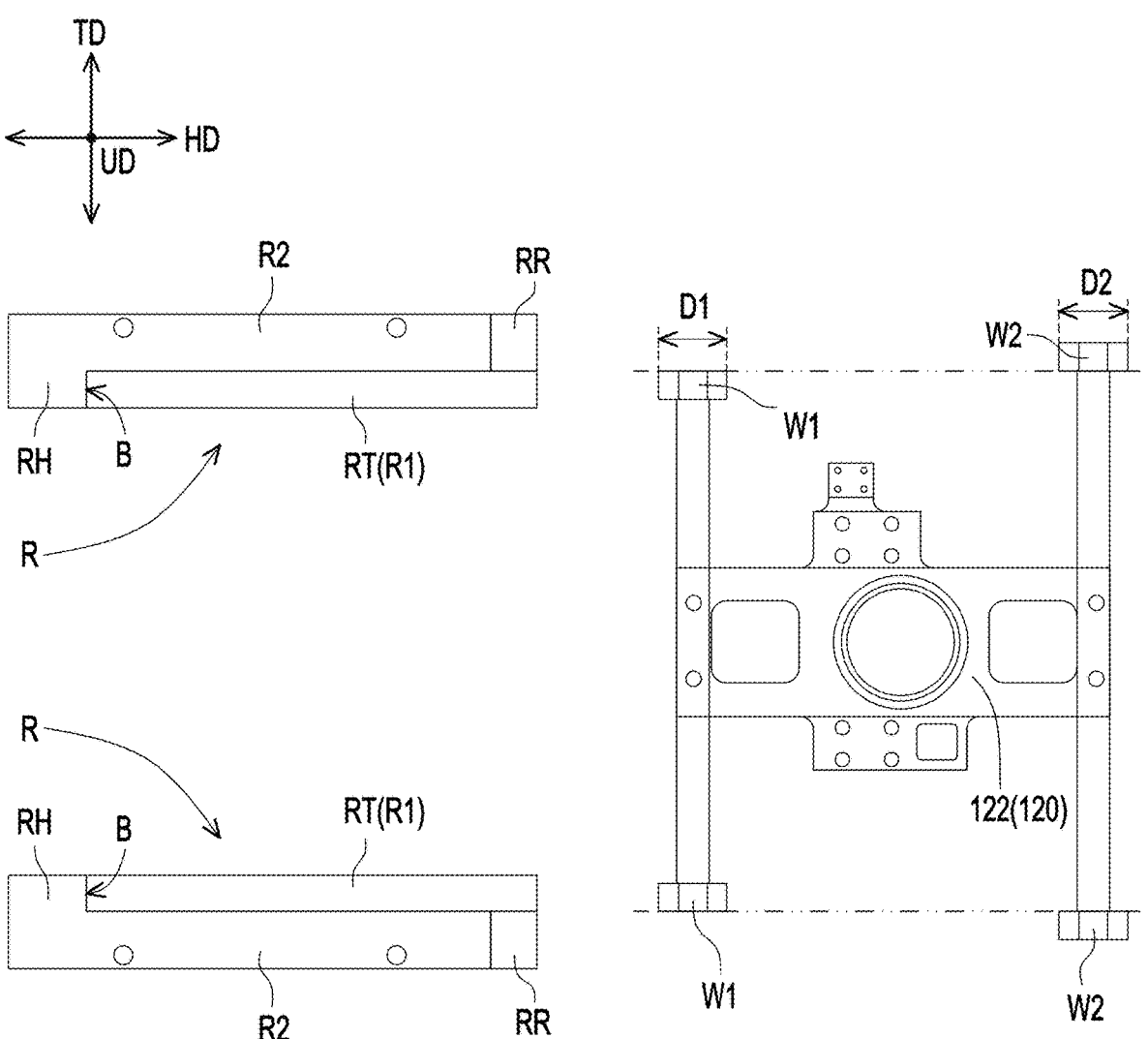
FIG. 2 is a top view of a horizontal moving mechanism of an object conveying apparatus before entering a rail in an embodiment of the disclosure.
Figure 3:
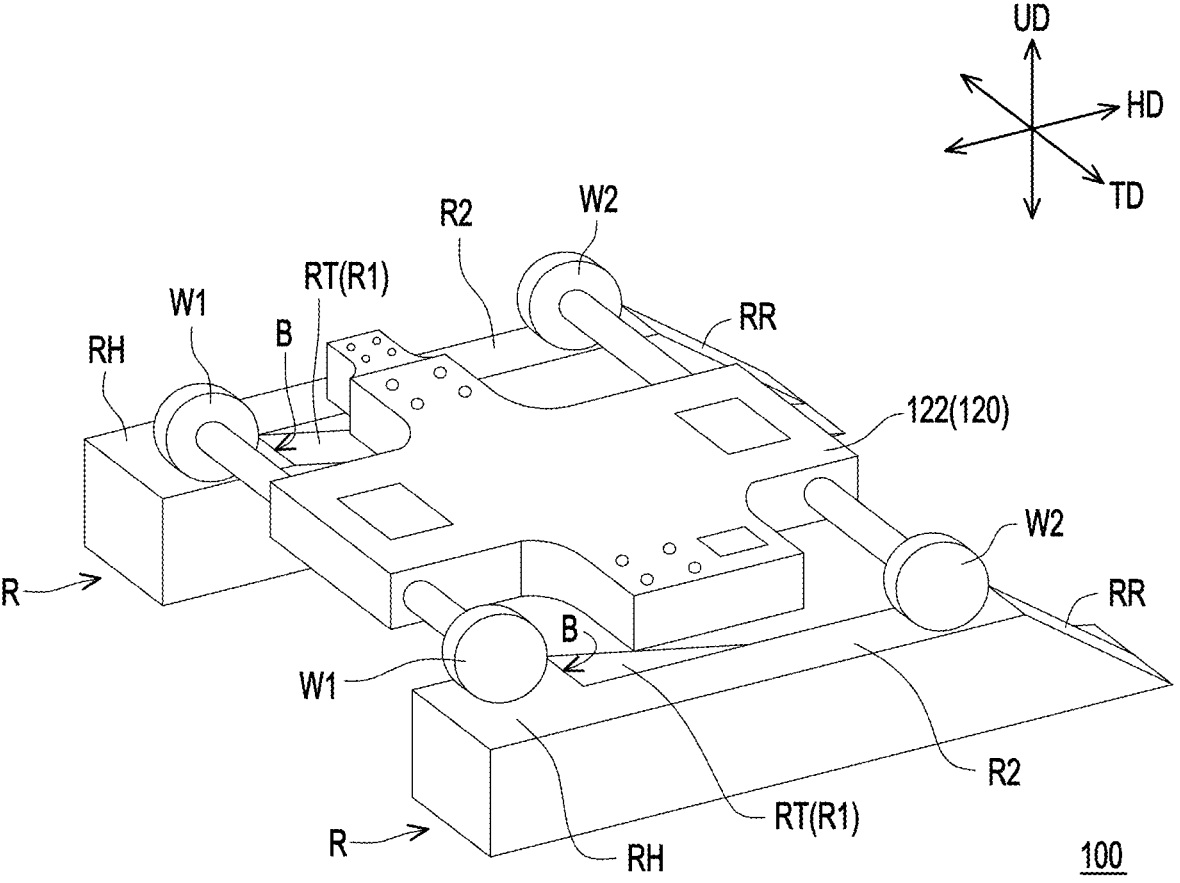
FIG. 3 is a schematic perspective view of the horizontal moving mechanism in FIG. 2 after entering the rail.

FIGS. 1A and 1B are schematic views of an object conveying system of the disclosure in different operating states. FIG. 2 is a top view of a horizontal moving mechanism of an object conveying apparatus before entering a rail in an embodiment of the disclosure. FIG. 3 is a schematic perspective view of the horizontal moving mechanism in FIG. 2 after entering the rail. In this embodiment, an object conveying system 10 conveys an object O (e.g., a wafer, etc.) to various stopping points in a semiconductor factory, for example, to improve overall production efficiency. However, in other embodiments not shown, the object conveying system 10 may also be applied in other working areas suitable for conveying objects, and the disclosure is not limited to the above situation. The object conveying system 10 includes an object conveying apparatus 100 and a mounting table 200 configured adjacent to the object conveying apparatus 100. Furthermore, for example, the object conveying apparatus 100 moves along a traveling direction TD (as shown in a vertical direction of FIGS. 1A and 1B) on a traveling rail TR connecting each of the stopping points, and stops between the two mounting tables 200 in a horizontal direction HD (as shown in a left-right direction of FIGS. 1A and 1B). Therefore, when the object conveying apparatus 100 stops at the stopping point, it is equivalent to the mounting table 200 being configured adjacent to the object conveying apparatus 100. That is, in the object conveying system 10, the object conveying apparatus 100 is provided movable and the mounting table 200 is provided fixed. However, in other embodiments not shown, there may be only one mounting table 200 provided according to actual needs, and the disclosure is not limited thereto. The structure and operation mode of the object conveying system 10 are further described below.

Referring to FIGS. 1A and 1B, in this embodiment, the object conveying apparatus 100 includes a traveling member 110, a vehicle member 120, and a transporting member 130. The traveling rail TR is disposed above the object conveying apparatus 100 in an up-down direction UD (the up-down direction in the drawings of FIGS. 1A and 1B), and the traveling member 110 is configured on the traveling rail TR to move along the traveling direction TD, for example, realizing movement on the traveling rail TR through a driving device that is not shown. The vehicle member 120 is disposed below the traveling member 110 in the up-down direction UD, and includes a horizontal moving mechanism 122 that moves along the horizontal direction HD, and a lifting mechanism 124 that moves along the up-down direction UD. The transporting member 130 is disposed below the lifting mechanism 124, and is used to carry or set down the object O as the lifting mechanism 124 moves downward. Therefore, when the object conveying apparatus 100 stops at a side of the mounting table 200 through the movement of the traveling member 110, the vehicle member 120 moves along the horizontal direction HD through the horizontal moving mechanism 122 and moves along the up-down direction UD through the lifting mechanism 124, allowing the transporting member 130 to approach the mounting table 200. In addition, as shown in FIGS. 1A and 1B, the vehicle member 120 is covered by a shell, and the horizontal moving mechanism 122, the lifting mechanism 124, the transporting member 130, and the object O all enter and exit from the inside of the shell. However, the disclosure is not limited thereto.

Furthermore, in this embodiment, a rail R extending along the horizontal direction HD is configured between the object conveying apparatus 100 and the mounting table 200. As shown in the state change between FIG. 1A and FIG. 1B, the horizontal moving mechanism 122 of the vehicle member 120 moves back and forth along the rail R in the horizontal direction HD between the object conveying apparatus 100 and the mounting table 200 at one side in the horizontal direction HD (i.e., a side of a first mounting table 202, the left side of the drawings in FIG. 1A and FIG. 1B). In other embodiments not shown, the horizontal moving mechanism 122 of the vehicle member 120 may also move back and forth along the rail R facing the horizontal direction HD between the object conveying apparatus 100 and the mounting table 200 on another side in the horizontal direction HD (i.e., a side of a second mounting table 204, the right side of the drawings in FIG. 1A and FIG. 1B). The disclosure is not limited to the content shown in FIG. 1A and FIG. 1B. That is to say, the subsequent description of the relative position and operation between the object conveying apparatus 100 and the mounting table 200 takes the mounting table 200 at one side (the side of first mounting table 202) in the horizontal direction HD as an example, but may also be applied to the mounting table 200 (if any) of another side in the horizontal direction HD, and the moving direction thereof may be adjusted according to needs (as described later).

Referring to FIGS. 1A to 3, in this embodiment, a first wheel W1 is disposed on one side (close to the side of the first mounting table 202) of the horizontal moving mechanism 122 in the horizontal direction HD, and a second wheel W2 is disposed on another side (close to the side of the second mounting table 204). The second wheel W2 is provided to prevent a central part of the horizontal moving mechanism 122 from bending due to weight when only the first wheel W1 or the object conveying apparatus 100 supports the horizontal moving mechanism 122, requiring the second wheel W2 to provide auxiliary support. As shown in FIGS. 2 and 3, the rail R includes a tilt portion RT and a horizontal portion RH. The tilt portion RT extends obliquely in the direction away from the object conveying apparatus 100 in the horizontal direction HD and upward in the up-down direction UD. That is, a tilt direction of the tilt portion RT is to go upward in the up-down direction UD as going away from the object conveying apparatus 100.

Furthermore, as shown in FIGS. 1B and 3, when the horizontal moving mechanism 122 moves in the direction away from the object conveying apparatus 100 in the horizontal direction HD, the first wheel W1 and the second wheel W2 move along the rail R. The first wheel W1 moves along the tilt portion RT on the rail R and gradually lifts upward in the up-down direction UD, and then the tilt of the vehicle member 120 begins to be corrected. At this time, the first wheel W1 is further away from the object conveying apparatus 100 than the second wheel W2. However, in other embodiments not shown, the reverse may also be done, for example, the second wheel W2 is further away from the object conveying apparatus 100 than the first wheel W1, and the second wheel W2 moves along the tilt portion RT on the rail. Moreover, when the horizontal moving mechanism 122 moves to the mounting table 200, from the perspective of viewing in the traveling direction TD, a boundary B of the tilt portion RT and the horizontal portion RH is located between the first wheel W1 and the second wheel W2 (see FIG. 3). Therefore, at this time, after the first wheel W1 is guided by the tilt portion RT, the vehicle member 120 becomes horizontal.

It may be seen that in the object conveying apparatus 100 of the object conveying system 10 of this embodiment, the horizontal moving mechanism 122 of the vehicle member 120 moves along the rail R having the tilt portion RT and the horizontal portion RH, and the tilt portion RT extends obliquely in the direction away from the object conveying apparatus 100 and upward in the up-down direction UD. When the first wheel W1 and the second wheel W2 in the horizontal moving mechanism 122 move along the rail R, at least one of the first wheel W1 or the second wheel W2 passes through the tilt portion RT on the rail R, so that the tilt of the vehicle member 120 is corrected. Moreover, after the horizontal moving mechanism 122 moves to the mounting table 200, the boundary B of the tilt portion RT and the horizontal portion RH is located between the first wheel W1 and the second wheel W2. That is, at least one of the first wheel W1 or the second wheel W2 is located on the horizontal portion RH. Accordingly, the object conveying system 10 of this embodiment can correct the tilt angle of the vehicle member 120 and reduce the impact when entering the rail R.

Referring to FIG. 2, furthermore, in this embodiment, a size D1 of the first wheel W1 is the same as a size D2 of the second wheel W2. The first wheel W1 and the second wheel W2 are staggered in the traveling direction TD. Taking FIG. 2 as an example, the first wheel W1 is disposed closer to the inside (that is, closer to the center of the horizontal moving mechanism 122) than the second wheel W2 in the traveling direction TD. However, the disclosure is not limited thereto, which may also be that the second wheel W2 is disposed closer to the inside (that is, closer to the center of the horizontal moving mechanism 122) in the traveling direction TD. The rail R includes a first rail R1 and a second rail R2 that are adjacently disposed in the traveling direction TD and correspond to the first wheel W1 and the second wheel W2 respectively. That is, the first wheel W1 and the second wheel W2 are disposed to be staggered in the traveling direction TD in accordance with the first rail R1 and the second rail R2 which are adjacently disposed in the traveling direction TD. Therefore, when the horizontal moving mechanism 122 moves in the direction away from the object conveying apparatus 100 in the horizontal direction HD (i.e., the left side in FIG. 2), the first wheel W1 is further away from the object conveying apparatus 100 than the second wheel W2. The first wheel W1 moves along the first rail R1, and the second wheel W2 moves along the second rail R2.

Furthermore, in this embodiment, as shown in FIGS. 2 and 3, the tilt portion RT is disposed on the first rail R1. The horizontal portion RH is disposed on the first rail R1 and the second rail R2, and the horizontal portion RH is disposed at a position further away from the object conveying apparatus 100 than the tilt portion RT. That is, an end of the rail R away from the horizontal moving mechanism 122 in FIG. 2. The tilt portion RT extends obliquely toward the horizontal portion RH. The second rail R2 may also be disposed as a horizontal rail with the same height as the horizontal portion RH in the up-down direction UD (as shown in FIG. 3), but the disclosure is not limited thereto. In addition, the second rail R2 is provided with a bridging portion RR to reduce the height difference and the impact when the second wheel W2 enters the rail R. However, the disclosure does not limit whether the bridging portion RR is disposed or not, which may be adjusted according to needs.

Therefore, when the horizontal moving mechanism 122 moves in the direction away from the object conveying apparatus 100 in the horizontal direction HD, the first wheel W1 enters the rail R earlier than the second wheel W2, passes through the tilt portion RT while moving along the first rail R1, and is lifted upward along a tilt direction of the tilt portion RT. In this way, even if during the movement of the horizontal moving mechanism 122, the first wheel W1 is located at a lower position than the second wheel W2 before entering the rail R due to the influence of gravity, the first wheel W1 may still be lifted upward with an assistance of the tilt portion RT of the first rail R1 after entering the rail R, so that the overall height of the side of the first wheel W1 of the horizontal moving mechanism 122 (that is, a frame on which the first wheel W1, the second wheel W2, etc. are installed) is also lifted relative to the second wheel W2 to correct the tilt. When the horizontal moving mechanism 122 completely stops on the side of the mounting table 200, the first wheel W1 is located at the horizontal portion RH away from the object conveying apparatus 100, and the second wheel W2 is located at the horizontal portion RH close to the bridging portion RR, so that the whole of the vehicle member 120 is in a horizontal state. Accordingly, the object conveying system 10 of this embodiment can correct the tile angle of the vehicle member 120 and reduce the impact when entering the rail R.

Another implementation of tilt correction is be described below.

Figure 4:
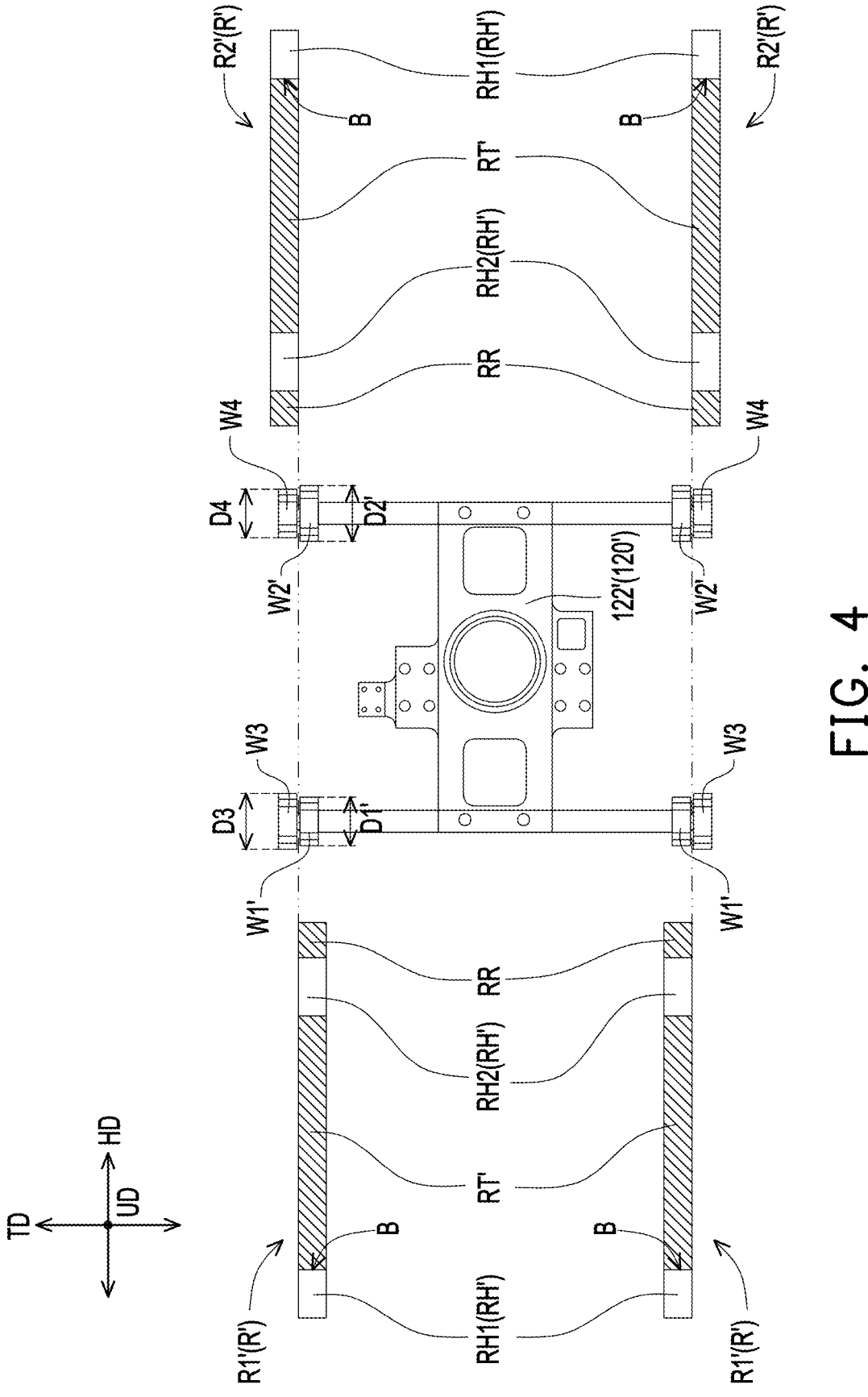
FIG. 4 is a top view of the horizontal moving mechanism of the object conveying apparatus before entering the rail in another embodiment of the disclosure.
Figure 5:
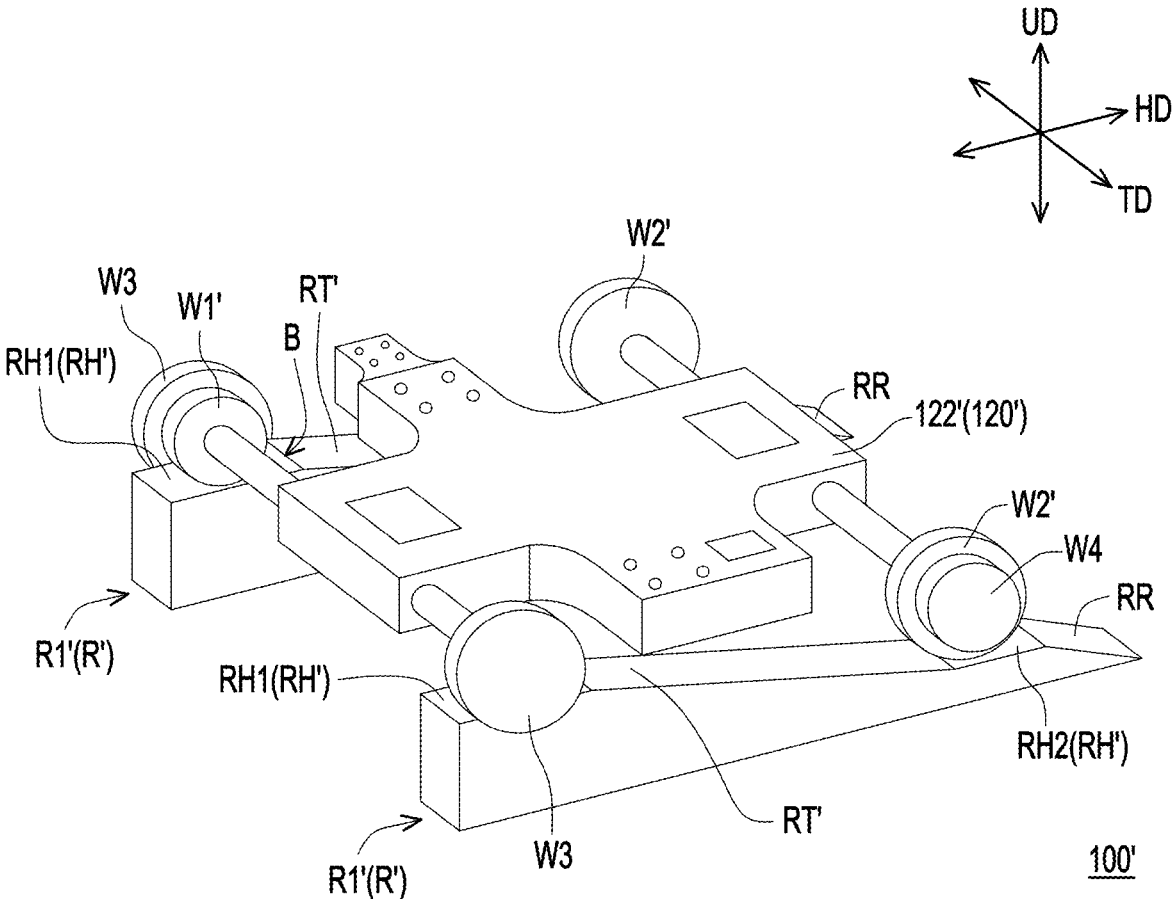
FIG. 5 is a schematic perspective view of the horizontal moving mechanism in FIG. 4 after being activated and entering the rail.

FIG. 4 is a top view of the horizontal moving mechanism of the object conveying apparatus before entering the rail in another embodiment of the disclosure. FIG. 5 is a schematic perspective view of the horizontal moving mechanism in FIG. 4 after being activated and entering the rail. In this embodiment, a vehicle member 120' is also applicable to the object conveying system 10, the object conveying apparatus 100 and the mounting table 200 shown in FIGS. 1A and 1B. Compared with the previous embodiment shown in FIGS. 2 and 3, a horizontal moving mechanism 122' of the vehicle member 120' of this embodiment is configured with more wheels, and a rail R' also has a different configuration way accordingly. For other unexplained structures, please refer to the description of the foregoing embodiments, which are not be repeated herein.

Referring to FIGS. 4 and 5, in this embodiment, the horizontal moving mechanism 122' of the vehicle member 120' is provided with a first wheel W1' on one side (the side close to the first mounting table 202) in the horizontal direction HD. The second wheel W2' is provided on another side (the side close to the second mounting platform 204). Furthermore, the rail R' includes a tilt portion RT' and a horizontal portion RH' (such as a subsequent first horizontal portion RH1 and a second horizontal portion RH2). The tilt portion RT' extends obliquely in a direction away from the object conveying apparatus 100 in the horizontal direction HD and upward in the up-down direction UD. In this way, when the horizontal moving mechanism 122' moves in the direction away from the object conveying apparatus 100 in the horizontal direction HD, the first wheel W1' and the second wheel W2' move along the rail R'. When the horizontal moving mechanism 122' moves to the mounting table 200, from the perspective of viewing in the traveling direction TD, the boundary between the tilt portion RT' and the horizontal portion RH' (such as the subsequent first horizontal portion RH1 and the second horizontal portion RH2) is located between the first wheel W1' and the second wheel W2' (see FIG. 5). Therefore, at this time, after the first wheel W1' is guided by the tilt portion RT', the vehicle member 120' becomes a horizontal state. Accordingly, the object conveying system 10 of this embodiment can correct the tilt angle of the vehicle member 120' and reduce the impact when entering the rail R'.

Referring to FIG. 4, furthermore, in this embodiment, a size D1' of the first wheel W1' is smaller than a size D2' of the second wheel W2'. The horizontal portion RH' includes the first horizontal portion RH1 and the second horizontal portion RH2 that is closer to the object conveying apparatus 100 than the first horizontal portion RH1. As shown in FIG. 5, the horizontal height of the first horizontal portion RH1 in the up-down direction UD is greater than the horizontal height of the second horizontal portion RH2 in the up-down direction UD. The tilt portion RT' is disposed between the first horizontal portion RH1 and the second horizontal portion RH2 to connect the two. That is, in the rail R, the horizontal heights of the up-down direction UD in descending order are the first horizontal portion RH1, the tilt portion RT', and the second horizontal portion RH2; sequentially from far away from the object conveying apparatus 100 to close to the object conveying apparatus 100 in the horizontal direction HD are the first horizontal portion RH1, the tilt portion RT', and the second horizontal portion RH2. Therefore, when the horizontal moving mechanism 122' moves in the direction away from the object conveying apparatus 100 in the horizontal direction HD (i.e., the left side in FIG. 5), the first wheel W1' is further away from the object conveying apparatus 100 than the second wheel W2'. When the horizontal moving mechanism 122' moves to the mounting table 200, the first wheel W1' is located at the first horizontal portion RH1, and the second wheel W2' is located at the second horizontal portion RH2. At this time, since the size D1' of the first wheel W1' is smaller, the first horizontal portion RH1 that is higher in the up-down direction UD may also be kept in the horizontal direction with the second wheel W2'. That is, the vehicle member 120' is horizontal.

Furthermore, as shown in FIGS. 1A and 1B, in this embodiment, the mounting table 200 includes a first mounting table 202 and a second mounting table 204. The first mounting table 202 is disposed on one side of the object conveying apparatus 100 (for example, the left side of FIGS. 1A and 1B). The second mounting table 204 is disposed on another side of the object conveying apparatus 100 (for example, the right side of FIGS. 1A and 1B). As shown in FIG. 4, the rail R' includes a first rail R1' and a second rail R2'. The first rail R1' is disposed between the object conveying apparatus 100' and the first mounting table 202. The second rail R2' is disposed between the object conveying apparatus 100' and the second mounting table 204. From the perspective of viewing in the horizontal direction HD, the first rail R1' and the second rail R2' are disposed adjacently (not directly adjacent). That is, the first rail R1' and the second rail R2' are disposed to be staggered in the horizontal direction HD. Taking FIG. 4 as an example, the second rail R2' is disposed outside in the traveling direction TD compared with the first rail R1'. However, the disclosure is not limited thereto. The first rail R1' may also be disposed relatively outside.

Referring to FIGS. 4 and 5, furthermore, in this embodiment, the first wheel W1' is adjacently configured with a third wheel W3 in the traveling direction TD. The second wheel W2' is adjacently configured with a forth wheel W4 in the traveling direction TD. Moreover, the third wheel W3 and the fourth wheel W4 are both disposed outside in the traveling direction compared with the first wheel W1' and the second wheel W2'. When the horizontal moving mechanism 122' moves toward a side where the first mounting table 202 is located in the horizontal direction HD, the first wheel W1' and the second wheel W2' move along the first rail R1', and the third wheel W3 and the forth wheel W4 are not in contact with the first rail R1'. When the horizontal moving mechanism 122' moves to another side where the second mounting table 204 is located in the horizontal direction HD, the third wheel W3 and the fourth wheel W4 move along the second rail R2', and the first wheel W1' and the second wheel W2' are not in contact with the rail R'. In other embodiments not shown, when the first wheel W1' and the second wheel W2' move along the first rail R1', the third wheel W3 and the fourth wheel W4 may also be brought into contact with the rail R' according to actual needs, and vice versa. However, the disclosure is not limited thereto.

Furthermore, in this embodiment, a size D3 of the third wheel W3 is the same as the size D2' of the second wheel W2'. A size D4 of the fourth wheel W4 is the same as the size D1' of the first wheel W1'. Therefore, the first wheel W1' is functionally equivalent to the fourth wheel W4. The second wheel W2' is functionally equivalent to the third wheel W3. In other words, the first wheel W1' and the second wheel W2' function when moving toward the side of the first mounting table 202. The third wheel W3 and the fourth wheel W4 function when moving toward the side of the second mounting table 204.

That is to say, when the horizontal moving mechanism 122' moves toward the first mounting table 202 along the horizontal direction HD, the first wheel W1' enters the first rail R1' earlier than the second wheel W2', thereby performing the tilt correction from the side of the first mounting table 202 of the horizontal moving mechanism 122', so that the first wheel W1' may be lifted upward through the tilt portion RT' of the first rail R1'. Accordingly, the object conveying system 10 of this embodiment can correct the tilt angle of the vehicle member 120 and reduce the impact when entering the rail R'. Correspondingly, when the horizontal moving mechanism 122' moves toward the second mounting table 204 along the horizontal direction HD, the third wheel W3 enters the second rail R2' earlier than the fourth wheel W4, thereby performing the tilt correction from the side of the second mounting table 204 of horizontal moving mechanism 122', so that the third wheel W3 may be lifted upward through the tilt portion RT' of the second rail R2'.

In this way, in the embodiment in which the two mounting tables 200 are provided, the rail R' on the left and right sides (the positions of the first rail R1' and the second rail R2' in the traveling direction TD, etc.) is configured to allow the same horizontal moving mechanism 122' to move back and forth in the horizontal direction HD, so that objects may be placed on the two mounting tables 200 on the left and right sides without performing complicated control operations on the horizontal moving mechanism 122'. Furthermore, the third wheel W3 and the fourth wheel W4 are added as members having the same function as the first wheel W1' and the second wheel W2', and are applied to the mounting table 200 on another side. However, in other embodiments not shown, there may be only one mounting platform 200 provided. At this time, the rail R' only includes the first rail R1', and the horizontal moving mechanism 122' is only provided with the first wheel W1' and the second wheel W2' and omits the third wheel W3 and the fourth wheel W4.

In summary, in the object conveying apparatus of the object conveying system of the disclosure, the horizontal moving mechanism of the vehicle member moves along the rail having the tilt portion and the horizontal portion. The tilt portion extends obliquely in a direction away from the object conveying apparatus and upward in the up-down direction. When at least one of the first wheel or the second wheel in the horizontal moving mechanism moves along the tilt portion on the rail, the tilt of the vehicle member is corrected. After the horizontal moving mechanism moves to the mounting table, the boundary between the tilt portion and the horizontal portion is located between the first wheel and the second wheel. That is, at least one of the first wheel or the second wheel is located on the horizontal portion. Accordingly, the object conveying system of the disclosure can correct the tilt angle of the vehicle member and reduce the impact when entering the rail.

What is claimed is:

1. An object conveying system, comprising an object conveying apparatus and a mounting table configured adjacent to the object conveying apparatus, wherein the object conveying apparatus comprises:
   a traveling member, configured on a traveling rail to move along a traveling direction;
   a vehicle member, disposed below the traveling member and comprising a horizontal moving mechanism that moves in a horizontal direction and a lifting mechanism that moves in an up-down direction; and
   a transporting member, disposed below the lifting mechanism, wherein
   a rail extending along the horizontal direction is configured between the object conveying apparatus and the mounting table, the horizontal moving mechanism moves back and forth along the rail between the object conveying apparatus and the mounting table in the horizontal direction,
   the horizontal moving mechanism is provided with a first wheel on one side in the horizontal direction and a second wheel on another side,
   the rail comprises a tilt portion and a horizontal portion, and the tilt portion extends obliquely in a direction away from the object conveying apparatus in the horizontal direction and upward in the up-down direction,
   in response to the horizontal moving mechanism moving in the direction away from the object conveying apparatus in the horizontal direction, the first wheel and the second wheel move along the rail, and
   in response to the horizontal moving mechanism moving to the mounting table, from a perspective of viewing in the traveling direction, a boundary between the tilt portion and the horizontal portion is located between the first wheel and the second wheel.

2. The object conveying system according to claim 1, wherein
   a size of the first wheel is the same as a size of the second wheel, and the first wheel and the second wheel are staggered in the traveling direction,
   the rail comprises a first rail and a second rail adjacently disposed in the traveling direction,
   in response to the horizontal moving mechanism moving in the direction away from the object conveying apparatus in the horizontal direction, the first wheel is further away from the object conveying apparatus than the second wheel, the first wheel moves along the first rail, and the second wheel moves along the second rail.

3. The object conveying system according to claim 2, wherein
   the tilt portion is disposed on the first rail,
   the horizontal portion is further away from the object conveying apparatus than the tilt portion, and
   the tilt portion extends obliquely toward the horizontal portion.

4. The object conveying system according to claim 1, wherein
   a size of the first wheel is smaller than a size of the second wheel,
   the horizontal portion comprises a first horizontal portion and a second horizontal portion closer to the object conveying apparatus than the first horizontal portion,
   a horizontal height of the first horizontal portion in the up-down direction is greater than a horizontal height of the second horizontal portion in the up-down direction, and
   the tilt portion is disposed between the first horizontal portion and the second horizontal portion to connect the two,
   in response to the horizontal moving mechanism moving in the direction away from the object conveying apparatus in the horizontal direction, the first wheel is further away from the object conveying apparatus than the second wheel, and
   in response to the horizontal moving mechanism moving to the mounting table, the first wheel is located at the first horizontal portion, and the second wheel is located at the second horizontal portion.

5. The object conveying system according to claim 4, wherein
   the mounting table comprises a first mounting table and a second mounting table, the first mounting table is disposed on one side of the object conveying apparatus, and the second mounting table is located on another side of the object conveying apparatus,
   the rail comprises a first rail and a second rail, the first rail is configured between the object conveying apparatus and the first mounting table, the second rail is configured between the object conveying apparatus and the second mounting table, and from a perspective of viewing in the horizontal direction, the first rail and the second rail are adjacently disposed, the first wheel is configured adjacent to a third wheel in the traveling direction, and the second wheel is configured adjacent to a fourth wheel in the traveling direction, in response to the horizontal moving mechanism moving to the side where the first mounting table is located in the horizontal direction, the first wheel and the second wheel move along the first rail, and in response to the horizontal moving mechanism moving to another side where the second mounting table is located in the horizontal direction, the third wheel and the fourth wheel move along the second rail.

6. The object conveying system according to claim 5, wherein a size of the third wheel is the same as a size of the second wheel, and a size of the fourth wheel is the same as a size of the first wheel.

\* \* \* \* \*